(12) United States Patent
Rolland

(10) Patent No.: US 8,779,061 B2
(45) Date of Patent: Jul. 15, 2014

(54) CURABLE ELASTOMERIC COMPOSITIONS

(71) Applicant: E I du Pont de Nemours and Company, Wilmington, DE (US)

(72) Inventor: Loic Pierre Rolland, Divonne les Bains (FR)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/652,702

(22) Filed: Oct. 16, 2012

(65) Prior Publication Data

US 2013/0109811 A1 May 2, 2013

Related U.S. Application Data

(60) Provisional application No. 61/551,599, filed on Oct. 26, 2011.

(51) Int. Cl.
*C08L 33/10* (2006.01)
*C08L 31/04* (2006.01)
*C08G 67/02* (2006.01)

(52) U.S. Cl.
USPC .......................... 525/190; 525/185; 525/539

(58) Field of Classification Search
USPC ........................................ 525/185, 190, 539
See application file for complete search history.

(56) References Cited

U.S. PATENT DOCUMENTS

| | | | |
|---|---|---|---|
| 3,873,494 A | 3/1975 | Lewis | |
| 3,883,472 A | 5/1975 | Greene | |
| 3,904,588 A | 9/1975 | Greene | |
| 4,275,180 A | 6/1981 | Clarke | |
| 4,329,276 A * | 5/1982 | Reardon | 524/502 |
| 4,543,440 A * | 9/1985 | Loomis | 525/539 |
| 5,498,669 A | 3/1996 | Williams | |
| 5,543,466 A | 8/1996 | Norman | |
| 6,136,920 A | 10/2000 | Hert | |
| 6,472,452 B2 * | 10/2002 | Ruepping | 522/121 |

FOREIGN PATENT DOCUMENTS

| | | |
|---|---|---|
| WO | 95/09200 | 4/1995 |
| WO | 03/064166 A1 | 8/2003 |
| WO | 2004/003060 A2 | 1/2004 |

* cited by examiner

*Primary Examiner* — Fred M Teskin

(57) ABSTRACT

A curable composition and an article produced therefrom are disclosed in which the composition can comprise an optional first component, a second component, and a third component; the optional first component includes a copolymer derived from ethylene and a polar monomer; the second component includes a copolymer derived from ethylene, a vinyl acetate or alkyl(meth)acrylate, and carbon monoxide; and the third component includes a copolymer derived from ethylene and an alkyl(meth)acrylate or a polymer of alkyl(meth)acrylate.

15 Claims, No Drawings

CURABLE ELASTOMERIC COMPOSITIONS

The application claims priority to U.S. provisional application No. 61/551,599, filed Oct. 26, 2011; the entire disclosure of which is incorporated herein by reference.

The present invention relates to curable elastomeric compositions.

BACKGROUND OF THE INVENTION

In the field of curable elastomeric compositions, base materials are most often provided in slabs, or blocks, of uncured gum base that have a weight of more than 25 kg. This stems from the inability of such base gums to be extruded into pellets because of their inherent stickiness and caking propensity, even at room temperature.

Thus, in order to be compounded into a variety of compositions having certain properties, such blocks of gum base need to be extensively chipped or milled into smaller lumps immediately before processing, which are ram-fed into the blending equipment under the simultaneous addition of fillers and additives. Such blending equipment can often only function batch wise, making the compounding of elastomeric compositions cumbersome and subject to the use of costly chipping and milling machinery.

It would be therefore desirable to provide a non-caking base gum that can be processed as a free-flowing particulate form such as pellets and which can be directly fed into an extruder in a continuous process without the need to previously chip it into smaller lumps.

In addition to their ability to be processed as free-flowing particulates, such base gum compositions preferably also have material properties that at least match the properties of common base gums and allow for the manufacture of highly demanding, at least partially cured, elastomeric compositions for applications experiencing large temperature variations such as in automotive, aerospace, rail and cabling applications.

SUMMARY OF THE INVENTION

The invention provides for a curable composition comprising, consisting essentially of, or consisting of, an optional first component, a second component, and a third component wherein the optional first component includes or is a copolymer derived from ethylene and a polar monomer containing at least 28 weight percent of a polar monomer based on the total weight of the copolymer;

the second component includes or is a copolymer derived from ethylene, a vinyl acetate or alkyl(meth)acrylate, and carbon monoxide;

the third component includes or is a copolymer derived from ethylene and an alkyl(meth)acrylate containing at least 45 weight percent of alkyl(meth)acrylate based on the total weight of said copolymers, polymers of alkyl(meth)acrylate, and/or combinations of two or more thereof.

The invention further provides for an article comprising the curable composition disclosed above.

DETAILED DESCRIPTION OF THE INVENTION

The term "curable" denotes a material that may be cross-linked through a chemical reaction or irradiation.

The term "(meth)acrylate" includes acrylate, methacrylate, or combinations thereof. As used herein including the claims, what follows the verb "is" is a definition of the term preceding "is".

The invention provides for a curable composition comprising, consisting essentially of, or consisting of, an optional first component, a second component, and a third component, wherein the optional first component includes or is a copolymer derived from ethylene and a polar monomer containing at least 28 weight percent of a polar monomer based on the total weight of the copolymer; the second component includes or is a copolymer derived from ethylene, a vinyl acetate or alkyl (meth)acrylate, and carbon monoxide; the third component includes or is a copolymer derived from ethylene and an alkyl(meth)acrylate containing at least 45 weight percent of alkyl(meth)acrylate based on the total weight of said copolymers, polymers of alkyl(meth)acrylate, and/or combinations of two or more thereof.

The optional first component may be chosen from the group consisting of copolymers of ethylene and a polar monomer and/or mixtures of such copolymers. If the optional first component is present in the curable composition, it can be from 15 to 85 weight percent, preferably of from 20 to 80 weight percent, and most preferably of from 50 to 70 weight percent, based on the total weight of the curable composition.

The copolymer of ethylene and a polar monomer may be chosen among copolymers of ethylene and a polar monomer such as alkyl(meth)acrylates or alkanoic acid esters of vinyl alcohol.

Preferably, the polar monomers may be chosen from the group consisting of vinyl acetate, butyl(meth)acrylate, ethyl (meth)acrylate, methyl(meth)acrylate, and combinations of two or more thereof.

The copolymers of ethylene and a polar monomer may further be grafted with maleic acid anhydride or maleic acid mono ester according to any processes well-known in the art. Alternatively, the copolymers of ethylene an a polar monomer may be copolymerized with maleic acid anhydride or maleic acid mono ester according to any processes well-known in the art.

The copolymer of ethylene and a polar monomer may have a melt flow index of from 0.5 to 100, preferably from 1 to 5, measured according to ASTM D1238 at 190° C. using a weight of 2.16 kilograms.

The copolymer of ethylene and a polar monomer may contain at least 28 weight percent, preferably of from 28 to 60 weight percent, more preferably of from 35 to 45 weight percent of a polar monomer, based on the total weight of the copolymer of ethylene and a polar monomer.

Copolymers of ethylene and a polar monomer may be obtained commercially from E. I. du Pont de Nemours and Company, Wilmington, Del., USA (DuPont) under ELVALOY® AC or ELVAX®.

The second component may be chosen from the group consisting of copolymers of ethylene, a vinyl acetate or an alkyl(meth)acrylate, carbon monoxide, and/or mixtures of two or more of such copolymers, and may be present of from 5 to 50 weight percent, 15 to 35 weight percent, 25 to 55 weight %, or 30 to 50 weight %, based on the total weight of the curable composition.

In the case where the optional first component is not present in the curable composition, the second component chosen from the group consisting of copolymers of ethylene, a vinyl acetate or an alkyl(meth)acrylate, carbon monoxide, and/or mixtures of two or more of such copolymers is preferably present of from 25 to 55 weight percent, more preferably of from 30 to 50 weight percent, and most preferably of from 35 to 45 weight percent, based on the total weight of the curable composition.

The copolymer of ethylene, vinyl acetate or alkyl(meth) acrylate, and carbon monoxide according to the present invention may be chosen among ethylene copolymers comprising of from 10 to 40 weight percent vinyl acetate or alkyl(meth)acrylate and of from 5 to 15 weight percent of carbon monoxide, based on the total weight of the copolymer of ethylene, vinyl acetate or alkyl(meth)acrylate and carbon monoxide.

The vinyl acetate or alkyl(meth)acrylate monomers may be chosen from the group consisting of vinyl acetate, methyl acrylate, ethyl acrylate, butyl acrylate, and combinations of two or more thereof.

In the case where the chosen monomer is an alkyl(meth)acrylate, the monomer is preferably butyl acrylate.

The second component may have a melt flow index of from 0.5 to 100, preferably of from 10 to 40, when measured according to ASTM D1238 at 190° C. using a weight of 2.16 kilograms.

In the case where the optional first component is not present in the curable composition, the third component of the curable composition may be chosen from the group consisting of copolymers of ethylene and alkyl(meth)acrylate containing at least 45 weight percent of alkyl(meth)acrylate, polymers of alkyl(meth)acrylate, and/or mixtures thereof is preferably present of from 45 to 75 weight percent, more preferably of from 50 to 70 weight percent, and most preferably of from 55 to 65 weight percent, based on the total weight of the curable composition.

The third component of the curable composition may be chosen from the group consisting of copolymers of ethylene and alkyl(meth)acrylate containing at least 45 weight percent of said alkyl(meth)acrylate, polymers of alkyl(meth)acrylate, and/or mixtures thereof, and may be present of from 5 to 90 weight percent, preferably of from 10 to 80 weight percent, or 45 to 75 weight %, based on the total weight of the curable composition.

The third component may contain at least 45 weight percent of the alkyl(meth)acrylate, preferably of form 45 to 70 weight percent, more preferably of from 55 to 65 weight percent, based on the total weight of the third component.

The alkyl(meth)acrylate of the third component may be chosen among methyl(meth)acrylate, ethyl(meth)acrylate and butyl(meth)acrylate, and is preferably methyl(meth)acrylate.

The third component may be also known in the art as ethylene acrylate rubbers or AEMs, and are commercially available from DuPont under VAMAC®.

The polymers of alkyl(meth)acrylate may preferably be chosen from homo- and co-polymers of one or more alkyl (meth)acrylates chosen from methyl(meth)acrylate, ethyl (meth)acrylate, propyl(meth)acrylate, butyl(meth)acrylate, isobutyl(meth)acrylate, n-pentyl(meth)acrylate, isoamyl (meth)acrylate, n-hexyl(meth)acrylate, 2-methylpentyl (meth)acrylate, n-octyl(meth)acrylate, 2-ethylhexyl(meth)acrylate, n-decyl(meth)acrylate, n-dodecyl(meth)acrylate, n-octadecyl(meth)acrylate, and/or combinations of two or more of such polymers.

More preferably, the polymer of alkyl(meth)acrylate may be chosen from homo- and co-polymers of one or more alkyl (meth)acrylates chosen from ethyl(meth)acrylate, propyl (meth)acrylate, butyl(meth)acrylate, n-pentyl(meth)acrylate n-hexyl(meth)acrylate, 2-ethylhexyl(meth)acrylate n-octyl (meth)acrylate, and/or combinations of two or more of such polymers.

For example, suitable polymers of alkyl(acrylate) are dipolymers of butyl acrylate and ethyl acrylate, of butyl acrylate and methyl acrylate, terpolymers of butyl acrylate, ethyl acrylate, methyl acrylate, and combinations of two or more thereof.

The polymers of alkyl(meth)acrylate can be also known in the art as polyacrylate rubbers, or ACMs. The polymer of alkyl(meth)acrylate can be a polymer essentially free of ethylene monomer.

The curable composition may be cut, pressed, molded, extruded, or otherwise processed into any suitable shape. Non-limiting examples include tubes, O-rings, bladders, gaskets, seals, plugs, flanges, hoses, couplings, bungs, roll coats, wire coating, cable coating, foams, adhesives, shoe soles, and the like.

The curable composition may be cured by any suitable means or by a curing agent, such as, for example chemical additives or radiation.

If the curing is carried out by chemical additives, the additive may be preferably chosen from heat activated curing additives that may be present in the composition of from 0.5 to 5 weight percent, based on the total weight of the composition. Such additives release radicals, such as for example peroxidic radicals that cause the curing, or cross-linking of curable compositions.

Exemplary heat activated chemical additives can include or is dialkyl peroxides such as for example dicumyl peroxide; tert-butyl peroxide; 1,3-1,4 bis-(tert-butylperoxyisopropyl)benzene; 2,5 dimethyl 2,5 di(tert-butylperoxyl)hexyne; 2,5 dimethyl 2,5 di(tert-butylperoxyl)hexane; di(t-butylperoxy)diisopropylbenzene; or combinations of two or more thereof.

If the curing is carried out by applying radiation, the curable composition of the invention may be exposed to ultraviolet radiation, electron beam radiation, gamma radiation, or beta radiation to provoke curing.

If the curing is carried out by applying heat, the curable composition of the invention may be heated in a steam autoclave, heated press or the like, to a temperature sufficient to trigger the heat activated curing additive. Post curing may include a gradual reduction of pressure and temperature.

The curable composition may be compounded, for example, by mixing the individual components in an extruder, conventional mixer, kneader, intermix, batch mixer, oven roll, melt blender, or combinations of two or more such methods.

The curable composition may further comprise from 0.0001 to about 20%, based on the total weight of the composition, one or more conventional additives such as, for example, antioxidants, antistatic agents, pigments, foaming agents, plasticizers, fillers, reinforcers, organic halogen flame retardants, inorganic flame retardants such as for example ATH (aluminum trihydrate), MDH (magnesium dihydrate), mica, calcium carbonate, silica, additional crosslinking agents, light stabilizers, co-agents, ultraviolet absorbers, and lubricants.

The curable composition may further be processed into a free-flowing form such as for example pellets or granules which can be obtained by for example extrusion pelletizing.

The invention also provides for an article comprising the curable composition according to the above. The article can include automotive parts, aerospace parts, rail parts, and cables

EXAMPLES

The composition of examples 1 to 6 is summarized in the following Table 1. Examples 1 and 3 were comparative examples comprising commonly used elastomeric compounds.

In Table 1, the following ingredients were used.

A denotes LEVAPREN® 700HV which was a copolymer of ethylene and vinyl acetate containing 70 weight % of vinyl acetate, based on the total weight of the copolymer and was obtained from Lanxess AG (Leverkusen, Germany).

B denotes LEVAPREN® 600HV which was a copolymer of ethylene and vinyl acetate containing 60 weight % of vinyl acetate, based on the total weight of the copolymer and was also obtained from Lanxess AG.

C denotes ELVAX® 40L03 which was a copolymer of ethylene and vinyl acetate containing 40 weight % of vinyl acetate, based on the total weight of the copolymer and was DuPont.

D denotes HYTEMP® PV04 which was a polyacrylate polymer obtained from Zeon Chemical L.P. (Louisville, Ky., USA).

E denotes ELVALOY® 742 which was a copolymer of ethylene, vinyl acetate, and carbon monoxide obtained from DuPont.

F denotes a copolymer of ethylene and methyl acrylate containing 62 weight % of methyl acrylate.

G denotes MARTINAL® which was an aluminum trihydrate (ATH) obtained from Albermarle (Arkansas, US).

H denotes LUPEROX® F40P which was an α,α'-di(tert-butyl peroxy)diisopropyl benzene obtained from Arkema (Colombes, France).

I denotes NAUGARD® 445 which was a bis(α,α-dimethylbenzyl)diphenylene obtained from Chemtura (Philadelphia, US).

J denotes ELVALOY® HP661 which was a copolymer of ethylene, nbutyl acrylate, and carbon monoxide obtained from DuPont.

K denotes LUPEROX® 101 XL45 which was an 2,5-dimethyl-2,5-di-(t-butyl peroxy)hexane obtained from Arkema (Colombes, France).

L denotes RUBBER CHEM HVA2 which is a N,N'-m-phenylene bismaleimide from Rubber Chemical acting as coagent.

M denotes SILANOGRAM HVS which is an oligomeric vinyl silane from Kettlitz and acting as coupling agent N denotes VANFRE VAM which is Polyoxyethylene octadecyl ether phosphate from Vanderbilt acting as processing aid O denotes ARMEEN 18D PRILLS which is a distilled primary amine, octadecyl from AkzoNobel and acting as processing aid P denotes STEARIC ACID which is a processing aid

TABLE 1

| Example | A | B | C | D | E | F | G | H | I |
|---|---|---|---|---|---|---|---|---|---|
| 1 | 100 | | | | | | 150 | 6 | 2 |
| 2 | | | 46 | 34 | 20 | | 150 | 6 | 2 |
| 3 | | 100 | | | | | 150 | 6 | 2 |
| 4 | | | 59 | 21 | 20 | | 150 | 6 | 2 |
| 5 | | | 46 | 34 | 20 | | 150 | 6 | 2 |
| 6 | | | 59 | | 20 | 21 | 150 | 6 | 2 |

All values shown are "phr", which denotes "parts by hundred rubber", as known and employed in the art.

The ingredients for each example in table 1 were blended on a Collin roll mill for 10 minutes at room temperature (23-27° C.) to produce blended ingredients, which were then molded into 2 mm thick slabs and subjected to a curing step in a heat press operating at 180° C. for 10 minutes.

To quench the curing reaction, the slabs were then removed from the heat press and submerged in a water bath at 10° C. until cool.

Tensile bars in the form of dumbbells were then cut out from the slabs for testing according to ISO2921:2005 and EN60811-2-1.

The ISO2921:2005 test results are shown in Table 2. In Table 2, the term "TR10 in ° C." shows the temperature in ° C. at which a stretched sample frozen at the indicated temperature had retracted by 10% after being gradually warmed up, according to ISO2921:2005. The term "TR30 in ° C." shows the temperature in ° C. at which a stretched sample frozen at the temperature had retracted by 30% after being gradually warmed up, according to ISO2921:2005.

TABLE 2

| Example | 1 | 2 | 3 | 4 | 5 | 6 |
|---|---|---|---|---|---|---|
| TR10 in ° C. | −14 | −19 | −22 | −19 | −20 | −17 |
| TR30 in ° C. | −1 | −3 | −8 | −4 | −6 | −4 |

As can be seen in Table 2, the examples 2, 4, 5, and 6 comprising the invention composition regained at least part of their elastomeric behavior at lower temperatures than (comparative) example 1, and within vicinity of (comparative) sample 3.

The EN60811-2-1 test results are shown in Table 3. In Table 3, the term "Elongation under load in %" shows the elongation of the corresponding sample, in %, after applying a load to the sample equivalent to 20 N per cm$^2$ at a temperature of 200° C., for 15 minutes, according to EN60811-2-1. The term "Elongation unloaded in %" shows the residual elongation in percent of the corresponding sample after removing the previously applied load to the sample equivalent to 20 N per cm$^2$ at a temperature of 200° C., for 15 minutes EN60811-2-1.

TABLE 3

| Example | 1 | 2 | 3 | 4 | 5 | 6 |
|---|---|---|---|---|---|---|
| Elongation under load in % | 217 | 58 | 12 | 12 | 15 | 10 |
| Elongation unloaded in % | 145 | 30 | 0 | 0 | 0 | 0 |

As can be seen in Table 3, the samples 2, 4, 5, and 6 comprising the invention composition regained most of their initial dimensions, with samples 4, 5, and 6 even fully regaining their initial dimensions under extreme heat conditions.

Cold bending test results are shown in Table 4, which shows the lowest temperature at which each sample, cut from the previously obtained 2 mm thick slabs, could be half-wrapped (bent into U shape) around a mandrel having a diameter of 6 mm, without formation of cracks or fractures visible to the naked eye in the bent section.

TABLE 4

| Example | 1 | 2 | 3 | 4 | 5 | 6 |
|---|---|---|---|---|---|---|
| Elongation under load in % | −20 | −30 | −30 | −30 | −30 | −30 |

As can be seen in Table 4, samples 2, 4, 5, and 6 comprising the invention composition could be bent at lower temperatures than (comparative) sample 1 without showing cracks or fractures.

The ingredients for each example in Table 5 were blended on a Collin roll mill for 10 minutes at room temperature (23-27° C.) to produce blended ingredients, which were then molded into 2 mm thick slabs and subjected to a curing step in a heat press operating at 180° C. for 10 minutes.

To quench the curing reaction, the slabs were then removed from the heat press and submerged in a water bath at 10° C. until cool.

Tensile bars in the form of dumbbells were then cut out from the slabs for testing according to ISO 37:2005 Cor 1 2008.

TABLE 5

| Example | A | F | G | I | J | K | L | M | N | O | P |
|---|---|---|---|---|---|---|---|---|---|---|---|
| 7 | 100 |    | 150 | 1 |    | 5 | 2 | 2 | 1 | 0.5 | 1 |
| 8 |     | 70 | 150 | 1 | 30 | 5 | 2 | 2 | 1 | 0.5 | 1 |
| 9 |     | 50 | 150 | 1 | 50 | 5 | 2 | 2 | 1 | 0.5 | 1 |

All values shown are "phr", which denotes "parts by hundred rubber", as known and employed in the art.

Tensile strength and elongation at break were measured before and after aging in standard oil IRM 903.

TABLE 6

|  | Example | | |
|---|---|---|---|
|  | 7 | 8 | 9 |
| Retention of elongation at break after 168 hours in oil IRM 903 at 100° C. (%) | +24 | +6 | −1 |

As can be seen in Table 6, samples 8, and 9 comprising the invention composition show less variation in elongation at break after exposure to oil than comparative example 7.

The ingredients for each example in table 7 were blended on a Collin roll mill for 10 minutes at 100° C. to produce blended polymers. Table 7 shows the composition of the examples 10, 11 and 12 in parts by hundred rubber for ingredients A, F and J, as well as the glass transition temperature for each of example 10, 11 and 12. The ingredients for each example in Table 7 were blended on a Collin roll mill for 10 minutes at 100° C. to produce blended polymers. As can be seen in Table 7, samples 11 and 12 comprising a composition according to the present invention show lower glass transition temperatures ($T_g$) than comparative example 7. This means that the compositions according to the present invention may be used as elastomeric parts at lower temperature than compositions known in the art. Glass transition temperatures were measured on these polymers blends using the DSC method.

TABLE 7

| Example | A | F | J | $T_g$ (° C.) |
|---|---|---|---|---|
| 10 | 100 |    |    | −10 |
| 11 |     | 70 | 30 | −30 |
| 12 |     | 50 | 50 | −30 |

Table 7 shows the composition of the examples 10, 11 and 12 in parts by hundred rubber for ingredients A, F and J, as well as the glass transition temperature for each of example 10, 11 and 12. The ingredients for each example in Table 7 were blended on a Collin roll mill for 10 minutes at 100° C. to produce blended polymers. As can be seen in Table 7, samples 11 and 12 comprising a composition according to the present invention show lower glass transition temperatures ($T_g$) than comparative example 7. This means that the compositions according to the present invention may be used as elastomeric parts at lower temperature than compositions known in the art. Glass transition temperatures were measured on these polymers blends using the DSC method.

The invention claimed is:

1. A composition comprising an optional first component, a second component, and a third component wherein
   the optional first component is present in the composition from 15 to 85 weight %, based on the total weight of the composition;
   the optional first component includes a copolymer derived from ethylene and a polar monomer containing at least 28 weight percent of a polar monomer based on the total weight of the copolymer;
   the second component is present in the composition from 5 to 50 weight %, based on the total weight of the composition;
   the second component includes a copolymer derived from ethylene, a vinyl acetate or alkyl(meth)acrylate, and carbon monoxide; and
   the third component includes a copolymer derived from ethylene and an alkyl(meth)acrylate containing at least 45 weight percent of alkyl(meth)acrylate based on the total weight of the copolymer, a polymer of alkyl(meth)acrylate, or combinations thereof.

2. The composition of claim 1 wherein the polar monomer is vinyl acetate, alkyl(meth)acrylate, or combinations thereof.

3. The composition of claim 1 wherein the composition comprises the optional first component and the polar monomer is vinyl acetate, alkyl(meth)acrylate, or combinations thereof.

4. The composition of claim 3 wherein the polymer of alkyl(meth)acrylate includes homopolymer or copolymer of at least one alkyl(meth)acrylate including ethyl(meth)acrylate, propyl(meth)acrylate, butyl(meth)acrylate, n-pentyl(meth)acrylate, n-hexyl(meth)acrylate, 2-ethylhexyl(meth)acrylate, n-octyl(meth)acrylate, or combinations of two or more thereof.

5. The composition of claim 3 wherein the polymer of alkyl(meth)acrylate includes homopolymer or copolymer of at least one alkyl(meth)acrylate including ethyl(meth)acrylate, propyl(meth)acrylate, butyl(meth)acrylate, n-pentyl(meth)acrylate, n-hexyl(meth)acrylate, 2-ethylhexyl(meth)acrylate, n-octyl(meth)acrylate, or combinations of two or more thereof.

6. The composition of claim 5 wherein the copolymer of ethylene and a polar monomer has a melt flow index of from 0.5 to 100, optionally from 1 to 5, when measured according to ASTM D1238 at 190° C. using a weight of 2.16 Kg.

7. The composition of claim 6 wherein the second component is present in the composition from 15 to 35 weight %, based on the total weight of the composition.

8. The composition of claim 6 wherein the polar monomer is present from 28 to 60 weight %, based on the total weight of the copolymer of ethylene and the polar monomer.

9. An article comprising the composition as recited in claim 1.

10. The article of claim 9 including automotive part, aerospace part, rail part, or cable.

11. The article of claim 10 wherein the second component is present in the composition from 15 to 35 weight %, based on the total weight of the composition.

12. The article of claim 11 wherein the polar monomer is vinyl acetate, alkyl(meth)acrylate, or combinations thereof.

13. The article of claim 11 wherein the polymer of alkyl(meth)acrylate includes homopolymer or copolymer of at least one alkyl(meth)acrylate including ethyl(meth)acrylate, propyl(meth)acrylate, butyl(meth)acrylate, n-pentyl(meth)acrylate, n-hexyl(meth)acrylate, 2-ethylhexyl(meth)acrylate, n-octyl(meth)acrylate, or combinations of two or more thereof.

14. The article of claim 13 wherein the third component is present in the composition from 45 to 75 weight %, based on the total weight of the composition.

15. The article of claim 14 wherein the polar monomer is present from 28 to 60 weight %, based on the total weight of the copolymer of ethylene and the polar monomer.

* * * * *